United States Patent

[11] 3,631,688

[72] Inventor Irvin Quick
Greenwood, Ind.
[21] Appl. No. 81,843
[22] Filed Oct. 19, 1970
[45] Patented Jan. 4, 1972
[73] Assignee General Motors Corporation
Detroit, Mich.

[54] SHAFT COUPLING LOCKING DEVICE AND TOOL FOR INSTALLATION THEREOF
5 Claims, 11 Drawing Figs.

[52] U.S. Cl. ........................................... 64/9 R,
287/53 R, 416/171
[51] Int. Cl. ........................................... F16d 3/18
[50] Field of Search ........................................... 287/53 R,
53 SS; 64/9 R, 6; 416/171

[56] References Cited
UNITED STATES PATENTS
| | | | | |
|---|---|---|---|---|
| 2,432,933 | 12/1947 | Peterson | | 287/53 R |
| 2,738,125 | 3/1956 | Ledwith | | 287/53 R X |
| 3,406,535 | 10/1968 | Suderow | | 64/9 |

Primary Examiner—Andrew V. Kundrat
Attorneys—Jean L. Carpenter and Arthur N. Krein ABSTRACT: A shaft coupling locking device to lock the coupling between the telescoping compressor and turbine shafts of a gas turbine engine. A coupling threaded to the compressor shaft and turbine shaft of the engine, which are splined together for transmission of torque, is locked in position by means of a locking device having radially biased lock pins engageable in a locking groove in one of the shafts to prevent rotation and axial displacement of the threaded coupling. A special tool is used to engage the lock pins for installation or removal of the locking device.

PATENTED JAN 4 1972
3,631,688
SHEET 1 OF 4
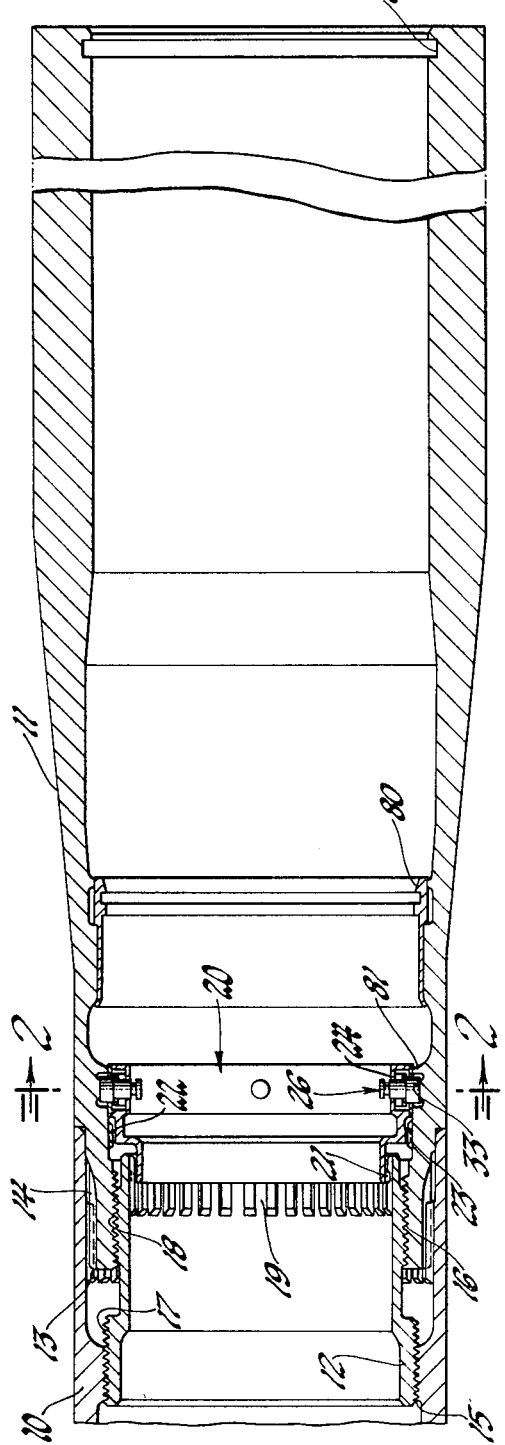
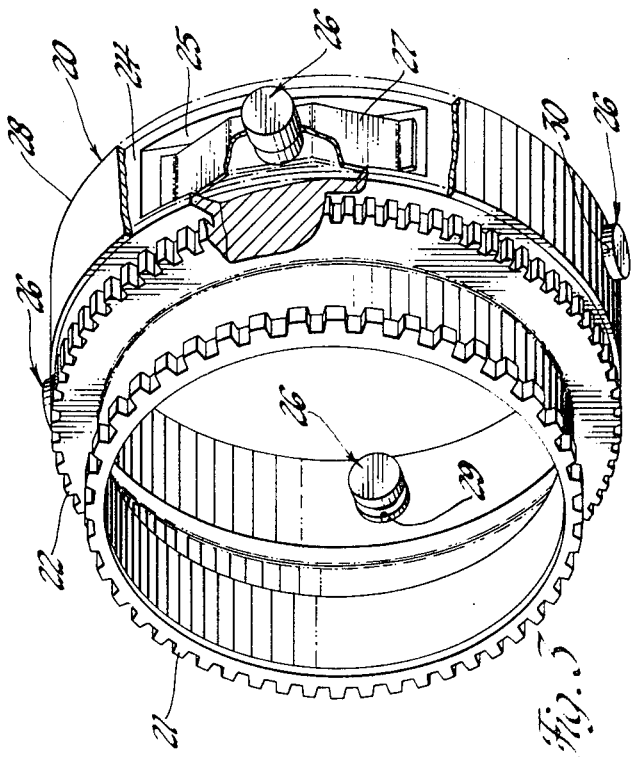
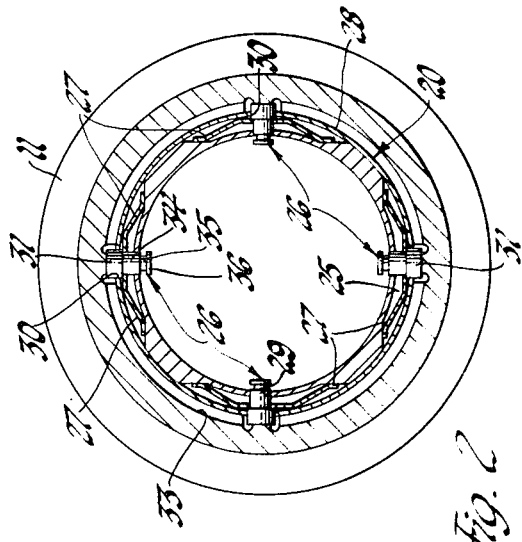
INVENTOR.
Irvin Quick
BY
Arthur N. Krein
ATTORNEY

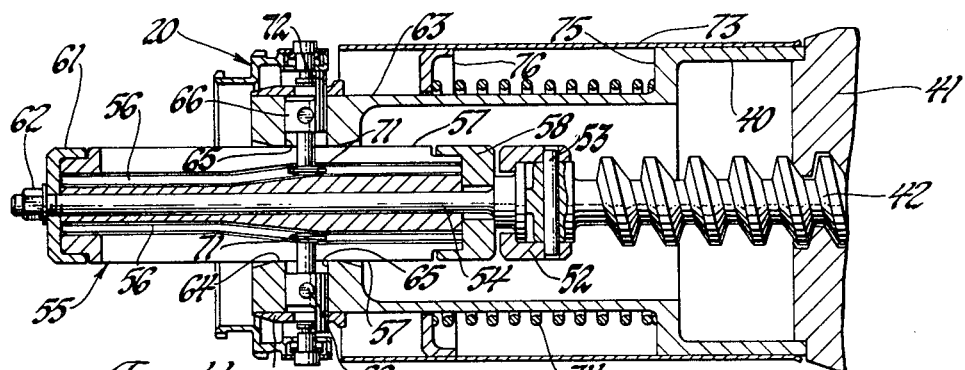
Fig. 4
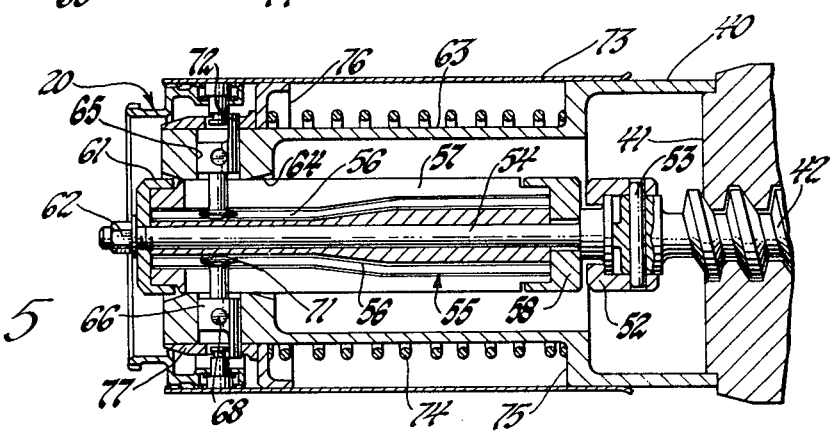
Fig. 5
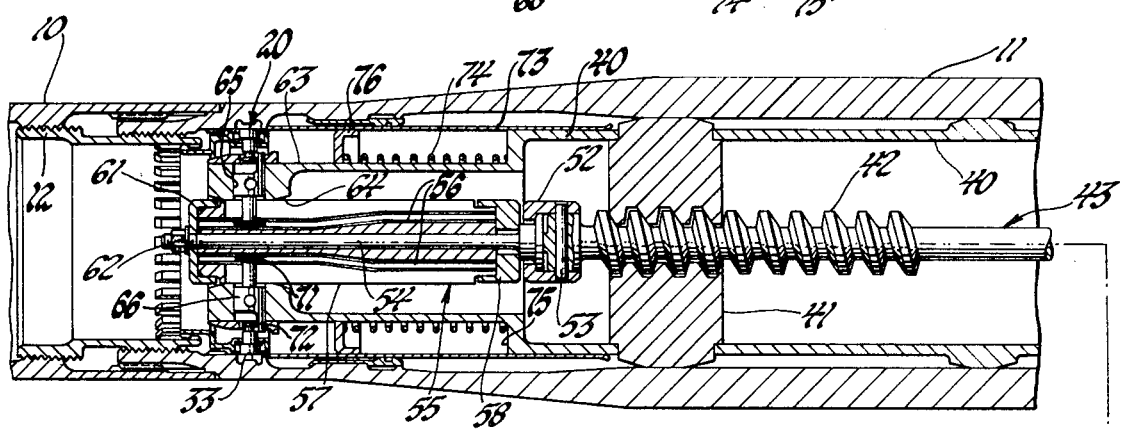
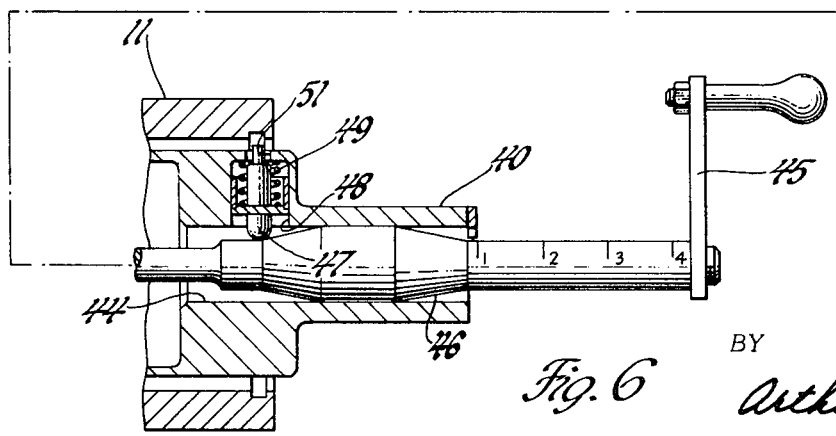
Fig. 6
INVENTOR.
Irvin Quick
BY
Arthur N. Krein
ATTORNEY

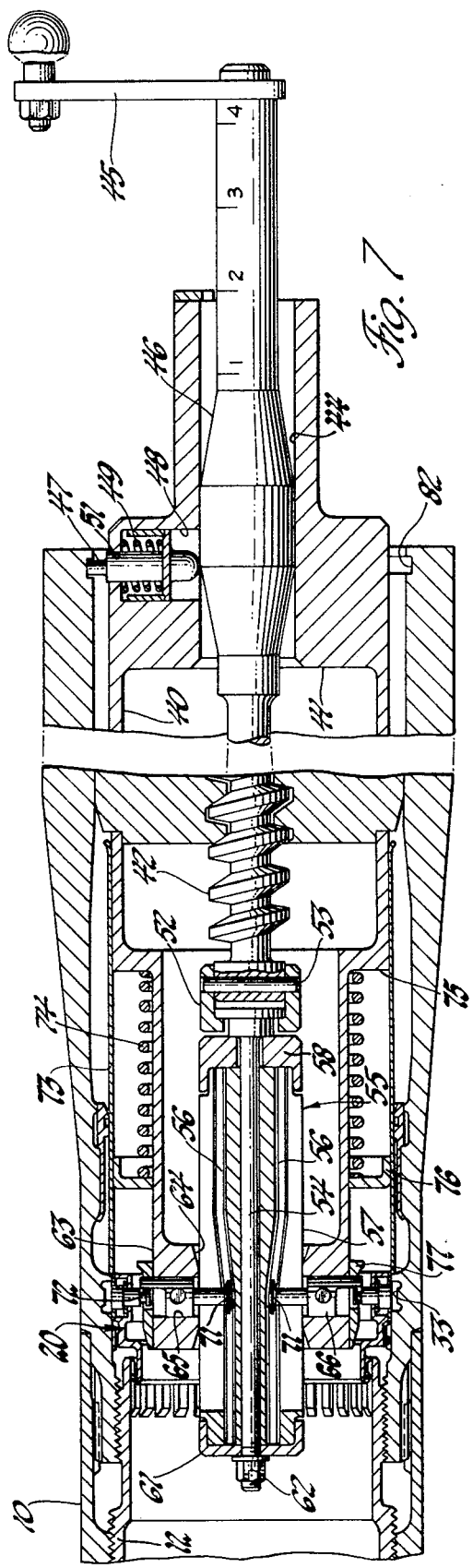
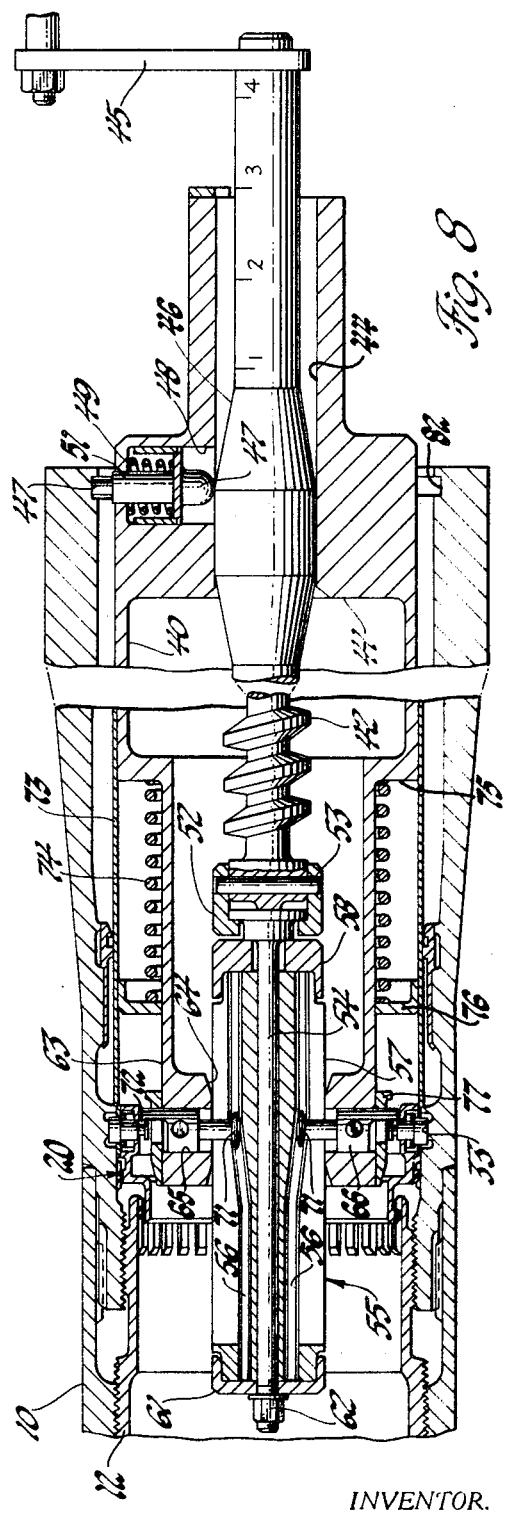

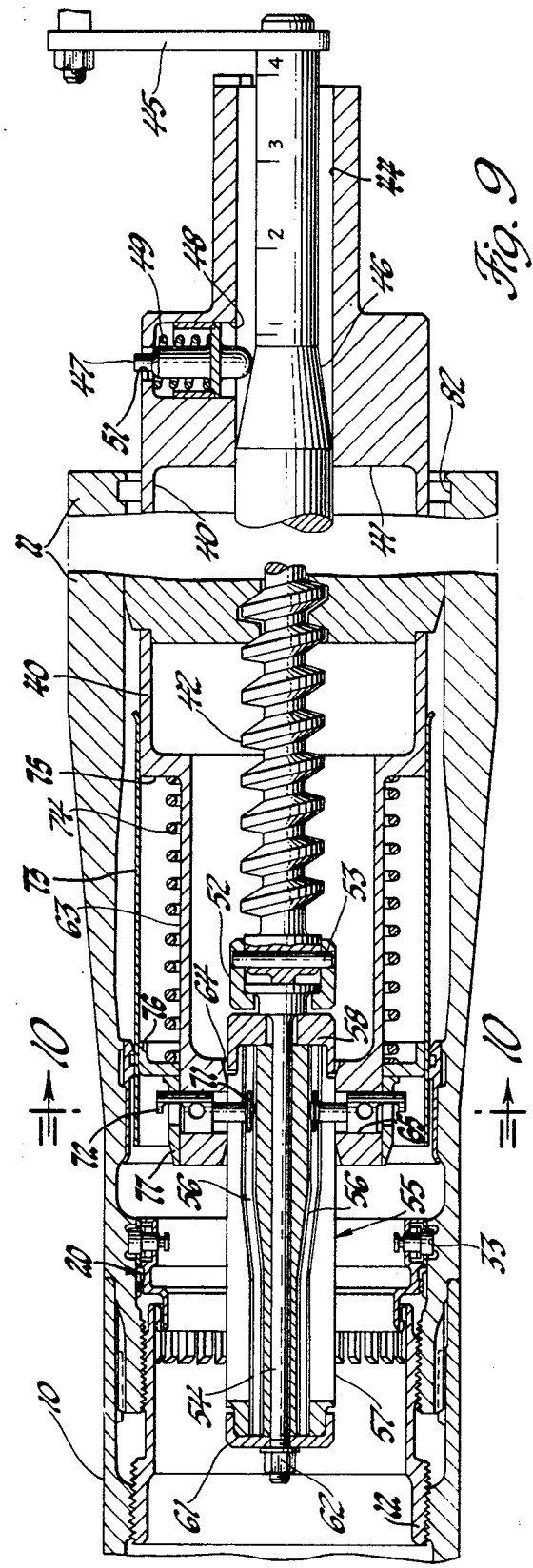
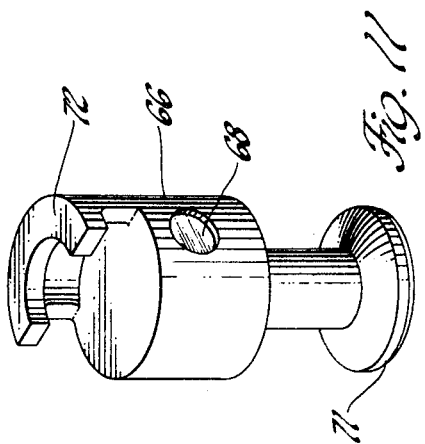
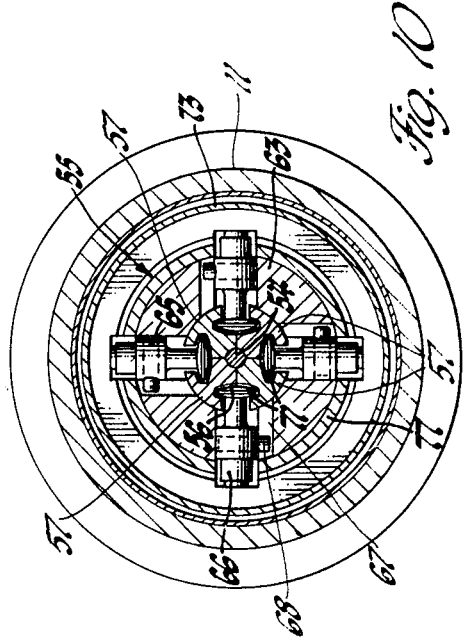

SHAFT COUPLING LOCKING DEVICE AND TOOL FOR INSTALLATION THEREOF

This invention relates to a shaft coupling and, particularly, to a shaft coupling for coupling together the hollow compressor and turbine shafts of a gas turbine engine by means of a threaded coupling and a locking device to secure the threaded coupling with respect to one of the shafts and, to a special tool for the installation and removal of the locking device, the special tool being constructed so that it cannot be removed unless the locking device is properly positioned to retain the threaded coupling.

This invention has particular applicability to gas turbine engines or similar devices wherein it is desirable to couple, for example, a turbine shaft to the shaft of a compressor driven by the turbine shaft and in which axial fixed adjustment of the position of the turbine shaft with respect to the compressor shaft is required. It is important that the adjustment and connection of these two shafts be preserved and that the coupling be unable to change position, particularly if such change might result in release of the thrust connection between these shafts.

Accordingly, the principal object of this invention is to provide a safe, secure locking device for the coupling between a pair of hollow shafts which prevents any relative rotation of the coupling with respect to either shaft after it is locked in position and which is readily installed or removed by a tool inserted through one of these shafts, with removal of the tool prevented unless the locking device is in a threaded coupling locking position.

Another object of this invention is to provide an improved shaft coupling lock device whereby a threaded coupling connection between two hollow shafts can be locked in position in a fail-safe manner.

Another object of this invention is to provide an improved shaft coupling locking device for use with a threaded coupling securing the compressor and turbine shafts of a gas turbine engine together in thrust and torque driving relation to each other whereby the locking device is fixed axially with respect to one of the shafts and splined to both this shaft and the threaded coupling.

Still another object of this invention is to provide a special tool to install the locking device whereby the tool cannot be removed unless the locking device is in coupling lock engagement.

These and other objects of the invention are obtained by means of a tubular coupling with external threads at opposite ends thereof adapted to threadingly engage internal threads on both the turbine shaft and compressor shaft of a gas turbine engine to retain these shafts in thrust and torque driving relation with each other. The coupling, threaded to these shafts, is then held in locked position by a lock ring spline-connected to both the coupling and one of the shafts, the lock ring being provided with radially outward biased lock pins adapted to engage into a locking groove provided in one of the shafts. A special tool with cam actuated locking fingers thereon engageable with the lock pins is used to install or remove the lock ring.

For a better understanding of the invention, as well as other objects and further features thereof, reference is had to the following detailed description of the invention to be read in connection with the accompanying drawings, wherein:

FIG. 1 is a partial view of a portion of a gas turbine engine taken on a plane containing the axis of rotation of the shafts and with the shafts coupled together and locked together with a locking device in accordance with the invention;

FIG. 2 is a sectional view taken along line 2—2 of FIG. 1;

FIG. 3 is a perspective view of the lock ring;

FIGS. 4 through 9, inclusive, illustrate the installation tool for installing the lock ring and the progressive procedural steps for the installation of the lock ring;

FIG. 10 is a sectional view of the installation tool taken along line 10—10 of FIG. 9; and, FIG. 11 is a perspective view of a locking finger of the installation tool.

Referring now to the drawings and, in particular to FIG. 1, there is illustrated, with reference to a gas turbine engine specifically, a compressor shaft 10 coupled to a high-pressure turbine shaft 11 of a gas turbine engine by means of a coupling 12. As shown, both the turbine shaft and compressor shaft are hollow with the compressor shaft 10 being provided with internal splines 13 which cooperate with external splines 14 of the turbine shaft to lock these two shafts for rotation together, the external diameter of a portion of the turbine shaft being such as to be slideably received with the end of the compressor shaft 10. Adjacent to its right-hand end, as seen in FIG. 1, the compressor shaft 10 is provided with internal threads 15 and the left-hand end of the turbine shaft 11, as seen in the same figure, is also provided with internal threads 16.

The coupling 12, in the form of an internal tubular nut or tie bolt, is provided at opposite ends thereof with threads 17 and 18 for engagement with the threads 15 and 16, respectively, of the compressor shaft 10 and turbine shaft 11, respectively. Thread sets 15 and 17 are of a different pitch than the thread sets 16 and 18 to provide for relative axial movement of these shafts during rotation of the coupling 12. At its right-hand end, as seen in FIG. 1, the coupling is provided with internal splines 19 which are adapted to receive the complimentary end of a suitable wrench, not shown, to effect rotation of the coupling to secure the turbine and compressor shafts together to the position shown in FIG. 1. The coupling can be rotated as desired to couple the turbine and compressor shafts together and to adjust the axial separation between these components as desired.

After installation of the coupling to effect the coupling and axial alignment of the turbine shaft and compressor shaft, the coupling 12 is then secured relative to these shafts by means of a lock ring, generally designated 20, constructed in accordance with the invention. The lock ring 20 is in the form of a stepped annular ring having at one end thereof external splines 21 with major and minor diameters such as to be slideably received in locking engagement with the splines 19 of coupling 12. In a similar manner, the lock ring 20 is provided with a second set of splines 22 intermediate its ends which is adapted to be slideably received in locking engagement with a corresponding set of internal splines 23 provided in the turbine shaft 11 closely adjacent to the threads 16 thereof.

At the opposite end from the splines 21, the lock ring 20 is provided with a peripheral flange 24 having a number of equally spaced, stepped pockets 25 and through bores 29 therein, four being shown in the embodiment described. In each pocket 25 there is positioned a detent or lock pin 26 slideably received in a through bore 29 and, a flat spring 27, the latter being retained by an apertured annular ring 28, suitably secured as by welding to the flange 24. Each lock pin 26 includes a lock portion 31 adapted to slideably extend through an aperture 30 provided for this purpose in the annular ring 28 to be received in an annular locking groove 33 provided in the turbine shaft 11, the lock pin further including an intermediate reduced body portion 34, a notched portion 35 and an end portion 36. Each lock pin 26 is normally biased radially outward by its cooperating spring 27 which is apertured to receive the intermediate body portion 34 of the pin, whereby the spring force is applied against the shoulder of the lock pin provided by the lock portion 31. As shown, the lock pins extend radially inward through the bores 29 in the lock ring whereby they can be gripped by a suitable installation tool, to be described, for movement of the lock pins radially inward against the biasing action of spring 27.

Referring now to FIGS. 4 through 11, inclusive, and in particular to FIGS. 6 through 10, the installation tool used to install and remove the lock ring 20, includes a hollow cylindrical body member 40, made, for example, in two parts suitably secured together with a threaded screw post 41 mounted therein to receive the threaded portion 42 of a tool crank 43 which extends through a crank bore 44 in one end of the body member 40, the right-hand end of the body member as seen in FIG. 7. The free end of the tool crank 43 is provided with a crank handle 45 to effect rotation of the tool crank for a purpose to be described. Intermediate the threaded portion and the crank handle, the tool crank is provided with a cylindrical cam portion 46 and adjacent thereto with scribe indicator marks identified as position numbers 1, 2, 3 and 4 to indicate axial displacement of the tool crank relative to the end of the body member 40, the tool crank being shown, for example, at position number 1 in FIG. 6.

The cam portion 46 of the tool crank is used to effect radial movement of a locating pin 47 slideably mounted in a cavity 48 provided in the body member, the locating pin being normally biased radially inward into engagement with the cam portion 46 by means of a coil spring 49 encircling the locating pin with one end of the spring in abutment against a shoulder of the locating pin and the other end of the spring engaging a wall forming the boundary of cavity 48, the locating pin being adapted to protrude through an aperture 51 in the wall of a body member 40 when cammed outward by the cam portion 46 of the tool crank for a purpose to be described.

At its opposite end, the tool crank 43 is secured by means of a cup-shaped coupling 52 fastened to the tool crank by pin 53, to the stepped end of shaft 54 of a lock pin cam assembly, generally designated 55, to effect axial movement of this assembly while permitting rotary movement of the tool crank relative thereto.

The lock pin cam assembly 55 is provided with axially extending cam grooves 56 therein. For ease in machining the cam grooves 56, the cam body 57 is, in the embodiment disclosed, made of four segments secured together around the shaft 54 by means of retainer caps 58 and 61 encircling the shaft at opposite ends of the cam body and secured thereto by nut 62 on the threaded end of the shaft 54, the retainer cap 58 abutting against the shoulder at the stepped end of shaft 54.

The forward reduced end portion 63 of body member 40 is provided with an axially extending end bore 64 to slideably receive and guide the lock pin cam assembly 55 and is provided with radially extending through bores 65 to slideably receive locking fingers 66, each of the through bores being provided with a parallel slot 67, as seen in FIG. 10, to receive the guide pins 68 secured in the locking fingers to prevent their rotation. Each of the tool fingers is provided at one end with a cam follower portion 71 adapted to ride in a cam groove 56 of the lock pin cam assembly 55, whereby upon axial displacement of this assembly will effect radial movement of the locking fingers outward or inward depending on the cam profile of the cam grooves 56 as axially displaced upon axial displacement of the lock pin cam assembly. At its opposite end, the lock finger is provided with a semicircular notched lock pin gripper portion 72 adapted to engage the notched end portions 35 and 36 of a lock pin to effect radial displacement of these lock pins in locking ring 20.

A guide sleeve or ring 73 encircles the steeped end of the body member 40 and is guided axially by sliding engagement with the outer periphery of the body member 40 and is normally biased to the left, to the position shown in FIG. 5 by means of a coiled spring 74 encircling the reduced end portion 63 of the body member, abutting at one end against the shoulder 75 on the body member 40 and at its other end against annular disc 76 secured to the guide sleeve 73, as by welding, with movement of the guide sleeve to the left being limited by an apertured annular stop 77 fixed to the end portion 63 of body member 40.

The procedure for installation of the lock ring into the position shown in FIG. 1 will now be described with reference to the six procedural steps illustrated in FIGS. 4 through 9, inclusive, and described as follows:

Referring first to FIG. 4, the tool crank 43 of the installation tool is rotated so that it is located at position number 3 with respect to the body member, the position corresponding to that shown in FIG. 8. The guide sleeve 73 is then manually forced to the right, to the position shown in FIG. 4, so that the lock ring 20 may be mounted on the end of the installation tool with the lock pins 26 slipped into engagement with the retaining lock pin gripper portions 72 of the locking fingers 66.

The tool crank is then rotated into position number 1 and as this is done, the locking fingers 66 moved radially inward by action of the cam follower portions 71 in the cam grooves 56 of the lock pin cam assembly to the position shown in FIG. 5, to force the lock pins 26 radially inward against the biasing action of springs 27 in the lock ring 20. This traps the lock ring 20 to the installation tool and it cannot be removed, except as described hereinafter. The guide sleeve 73 may now be allowed to spring back over the lock ring 20 as seen in FIG. 5. The guide sleeve acts as a pilot for the lock ring 20 during assembly into the turbine shaft structure and acts to protect the shaft seal 80 of the turbine shaft 11 from being damaged when the installation tool and lock ring are slid into this shaft.

The tool assembly and lock ring 20 are then slid into the turbine shaft 11 from the right-hand end thereof, as seen in FIG. 1, to the position shown in FIG. 6 wherein the guide sleeve 73 contacts the shoulder 81, inside the turbine shaft 11 adjacent to the locking groove 33 therein. As this occurs, the splines 21 and 22 of the lock ring 20 will have become engaged with the splines 19 and 23, respectively, of the coupling 12 and the turbine shaft 11, these splines being positioned in alignment before the lock ring 20 can be installed. Continued movement of the installation tool into the shaft, right to left to the position shown in FIG. 6, will then cause compression of the sleeve spring 74 causing the guide sleeve 73 to move to the right, to the position shown in FIG. 6, to uncover the lock ring 20. When the lock ring 20 has made contact with the shoulder of the splines 23 in the turbine shaft 11, the locating pin 47 has been moved into position in alignment with a locating groove 82 provided for this purpose in the free end of the turbine shaft 11, the lock pins 26 also being now in alignment with the locking groove 33 in the opposite end of the turbine shaft.

Rotation of the tool crank at this time to position number 2, as shown in FIG. 7, will now cause camming action of the locating pin 47 outward, by the rise of cam portion 46 of tool crank 43, into engagement with the locating groove 82 in the turbine shaft 11 insuring that the lock pins 26 are now retained in proper axial alignment relative to the locking groove 33 for movement into the locking groove. The installation tool is now locked into the turbine shaft and cannot be removed therefrom until the lock pins 26 are fully engaged into the locking groove 33 in this shaft.

The tool crank is then rotated into position number 3, as seen in FIG. 8, which by actuation of the cam grooves 56 will cause the locking fingers 66 to move radially outward releasing the lock pins 26 to allow them, by the biasing action of springs 27, to move into engagement with the locking groove 33 in the turbine shaft 11. The lock ring 20 is now trapped in the turbine shaft against axial displacement and the splines 21 and 22 on the lock ring 20 locks the coupling 12 to the turbine shaft 11.

The tool crank is then rotated into position number 4, as seen in FIG. 9, to allow the locating pin 47 to ride down the rear cam portion of cam portion 46 of the tool crank 43 whereby the locating pin 47 is biased radially inward by spring 49 out of engagement with the locating groove 82 in the turbine shaft 11. In the meantime, the locking fingers 66 have been moved axially out of engagement with the lock pins 26 so that the installation tool is now free to be removed from the turbine shaft as seen in FIG. 9.

This completes the installation of the lock ring in the high-pressure turbine and compressor shaft assembly and, the low-pressure turbine shaft, not shown, can now be inserted into the assembly to complete assembly of the gas turbine engine. However, to further insure that the lock ring is properly engaged, the low-pressure turbine shaft can be provided with an outer diameter such that it will not clear the lock pins 26 should they not be engaged in the locking groove 33.

For removal of the lock ring 20 from the assembly, the procedural steps just described are used, starting with the last mentioned step and working back to the first step described.

What is claimed is:

1. A shaft coupling comprising, in combination, a first hollow shaft having internal threads thereon, a second hollow shaft having internal threads thereon, said second shaft being telescoped over a portion of said first shaft, spline means on said first shaft and on said second shaft nonrotatably coupling said first shaft and said second shaft together, an annular coupling having external threads thereon threaded to said first shaft and to said second shaft, said coupling having internal splines thereon, a lock ring having external splines positioned within said first shaft with the splines of said lock ring in engagement with the splines of said coupling, means on said lock ring adapted for engagement with said first shaft for fixing said lock ring axially with respect to said first shaft, and spline means on said lock ring and on said first shaft adapted for engagement with each other to nonrotatably lock said lock ring to said first shaft.

2. A shaft coupling according to claim 1 wherein said means on said lock ring includes radially projecting detent means, means associated with said detent means for biasing said detent means radially outward, and said first shaft includes an annular groove therein to receive said detent means whereby said lock ring is fixed axially with respect to said first shaft.

3. The shaft coupling according to claim 1 wherein said means on said lock ring includes a plurality of lock pins, a plurality of radial through bores in said lock ring, each of said through bores being adapted to slideably receive a lock pin, spring means, each operatively connected to one of said lock pins and secured to said lock ring to normally bias said lock pins radially outward, said first shaft including an annular groove therein to receive said lock pins whereby said lock ring is fixed axially with respect to said first shaft, said lock pins, when in locking engagement in said annular groove, having an opposite end portion thereof extending radially inward of said lock ring.

4. A shaft coupling according to claim 3 in combination with a tool having radially extending locking fingers adapted to engage the radially inward projecting ends of said lock pins, and manually, axially moveable cam means operatively connected to said locking fingers to effect radial displacement of said locking fingers with corresponding radial displacement of said lock pins.

5. A shaft coupling comprising, in combination, a first hollow shaft having internal threads therein, a second hollow shaft having internal threads therein, said second shaft being telescoped over a portion of said first shaft, spline means on said first shaft and on said second shaft nonrotatably coupling said first shaft to said second shaft, an annular hollow coupling having external threads thereon threaded to said first shaft and to said second shaft for securing said shafts together and adjusting the axial position of these shafts with respect to each other, said coupling having internal splines thereon, a hollow lock ring having external splines thereon positioned in said first shaft with the splines of said lock ring in engagement with the splines on said coupling, said lock ring having radial through bores therein, a lock pin slideably received in each of said through bores, a spring means associated with each of said lock pins and connected to said lock ring for normally biasing said lock pins radially outward, said first shaft including an annular groove therein to receive said lock pins whereby said lock ring is fixed axially with respect to said first shaft and to said annular coupling, and spline means on said lock ring and on said first shaft in engagement with each other to nonrotatably lock said lock ring to said first shaft.

* * * * *